(12) United States Patent
Shinnae

(10) Patent No.: US 12,394,034 B2
(45) Date of Patent: Aug. 19, 2025

(54) INSPECTING PRINT QUALITY OF A PRINT PRODUCT WITH COORDINATE INFORMATION ACQUIRED WITHOUT PRINTING THE IMAGE DATA

(71) Applicant: CANON KABUSHIKI KAISHA, Tokyo (JP)

(72) Inventor: Toru Shinnae, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 479 days.

(21) Appl. No.: 17/885,717

(22) Filed: Aug. 11, 2022

(65) Prior Publication Data

US 2023/0064686 A1 Mar. 2, 2023

(30) Foreign Application Priority Data

Aug. 24, 2021 (JP) .................................. 2021-136148

(51) Int. Cl.
*G06T 7/00* (2017.01)
*H04N 1/00* (2006.01)

(52) U.S. Cl.
CPC ....... *G06T 7/0004* (2013.01); *H04N 1/00005* (2013.01); *G06T 2207/30144* (2013.01)

(58) Field of Classification Search
CPC ......... G06T 7/0004; G06T 2207/30144; G06T 2207/10008; G06T 7/001; H04N 1/00005
See application file for complete search history.

(56) References Cited

U.S. PATENT DOCUMENTS

| 10,726,556 B2 | 7/2020 | Oki |
| 2013/0141767 A1* | 6/2013 | LeCostaouec ..... H04N 1/00045 358/448 |
| 2022/0261975 A1* | 8/2022 | Hershman ............. G06F 3/1219 |

FOREIGN PATENT DOCUMENTS

| JP | 2004279445 A | 10/2004 |
| JP | 2018179699 A | 11/2018 |

* cited by examiner

*Primary Examiner* — Christopher Wait
(74) *Attorney, Agent, or Firm* — ROSSI, KIMMS & McDOWELL LLP

(57) ABSTRACT

A client computer which has generated a print job related to printing of a print product to be inspected transmits image data and layout information used for generating the print job to an inspection apparatus. The inspection apparatus receives and stores image data and layout information used for generating the print job from the client computer. The image scanned from the print product printed based on the print job and image data used for generating the print job are compared based on the layout information to inspect the print quality of the print product.

20 Claims, 9 Drawing Sheets

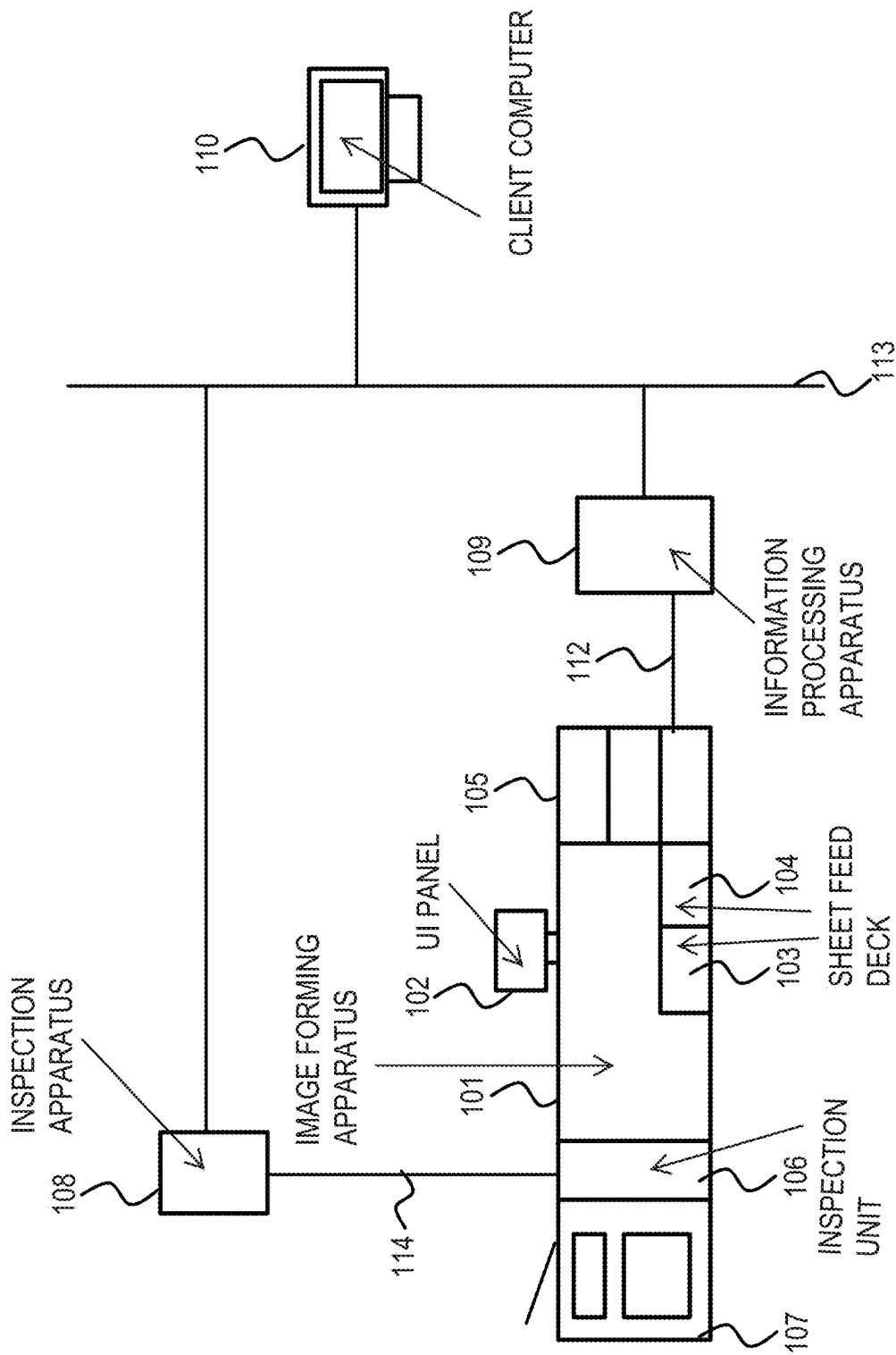

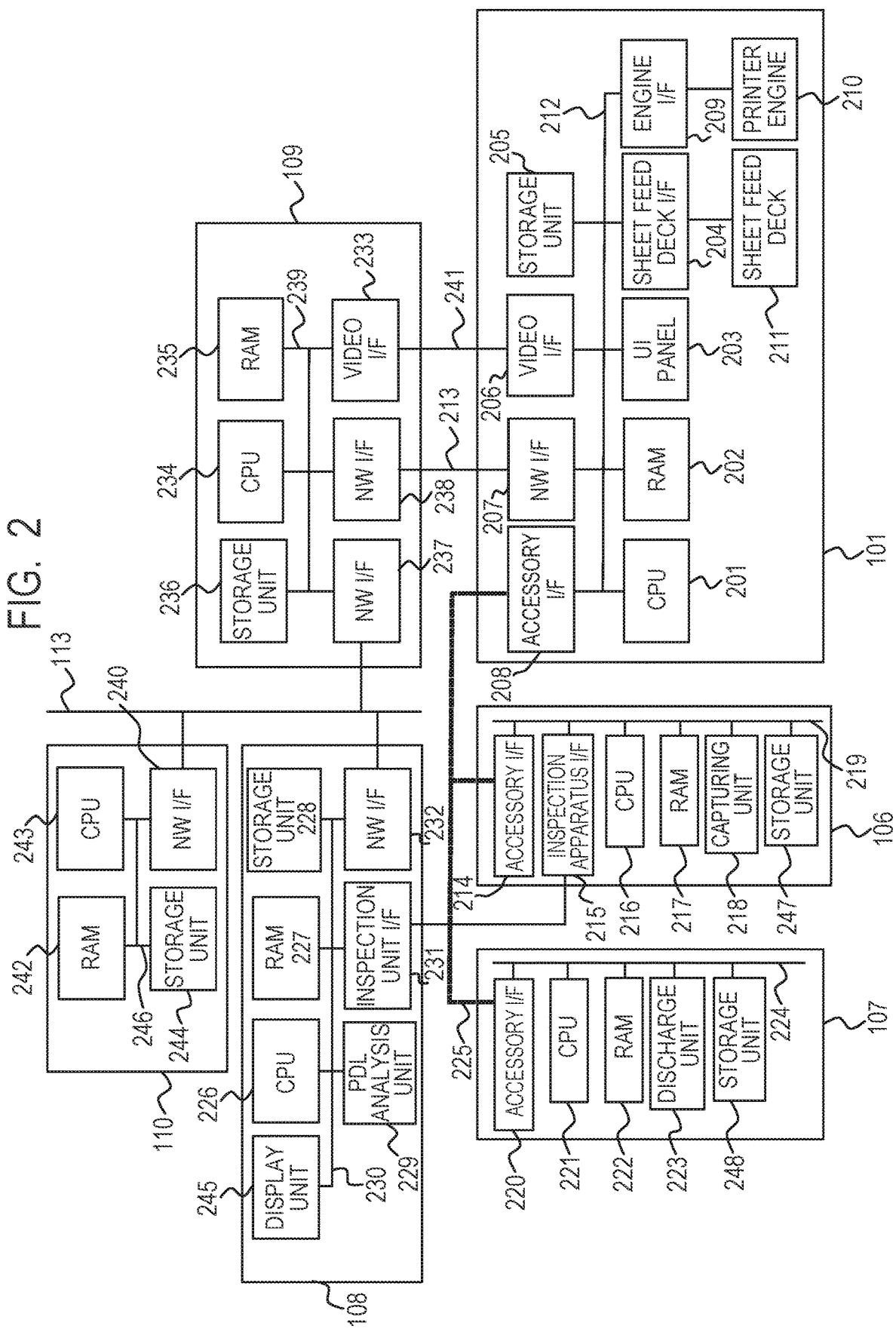

| COORDINATE | DATA ID | DATA NAME | DATA SIZE |
|---|---|---|---|
| X : 20<br>Y : 20 | 0001 | DATA A | Width : 100<br>Height : 55 |
| X : 130<br>Y : 20 | 0001 | DATA A | Width : 100<br>Height : 55 |
| X : 240<br>Y : 20 | 0001 | DATA A | Width : 100<br>Height : 55 |
| X : 20<br>Y : 85 | 0002 | DATA B | Width : 100<br>Height : 55 |
| X : 130<br>Y : 85 | 0002 | DATA B | Width : 100<br>Height : 55 |
| X : 240<br>Y : 85 | 0002 | DATA B | Width : 100<br>Height : 55 |
| X : 20<br>Y : 160 | 0003 | DATA C | Width : 100<br>Height : 55 |
| X : 130<br>Y : 160 | 0003 | DATA C | Width : 100<br>Height : 55 |
| X : 240<br>Y : 160 | 0003 | DATA C | Width : 100<br>Height : 55 |

FIG. 4

| JOB ID | DATA ID | DATA NAME | REFERENCE IMAGE | INSPECTION SETTING |
|---|---|---|---|---|
| 0001 | 0001 | DATA A | AAA.bmp | STAIN INSPECTION : LEVEL 1<br>STREAK INSPECTION : LEVEL 2 |
| 0001 | 0002 | DATA B | BBB.bmp | STAIN INSPECTION : NONE<br>STREAK INSPECTION : LEVEL 1 |
| 0001 | 0003 | DATA C | CCC.bmp | STAIN INSPECTION : LEVEL 2<br>STREAK INSPECTION : NONE |

FIG. 9

| JOB ID | PAGE NUMBER | COORDINATE | DATA ID | DATA NAME | DATA SIZE | INSPECTION RESULT |
|---|---|---|---|---|---|---|
| 0001 | 1 | X : 20<br>Y : 20 | 0001 | DATA A | Width: 100<br>Height : 55 | PASSED |
| 0001 | 1 | X : 130<br>Y : 20 | 0001 | DATA A | Width: 100<br>Height : 55 | PASSED |
| 0001 | 1 | X : 240<br>Y : 20 | 0001 | DATA A | Width: 100<br>Height : 55 | PASSED |
| 0001 | 1 | X : 20<br>Y : 85 | 0002 | DATA B | Width: 100<br>Height : 55 | FAILED |
| 0001 | 1 | X : 130<br>Y : 85 | 0002 | DATA B | Width: 100<br>Height : 55 | FAILED |
| 0001 | 1 | X : 240<br>Y : 85 | 0002 | DATA B | Width: 100<br>Height : 55 | PASSED |
| 0001 | 1 | X : 20<br>Y : 160 | 0003 | DATA C | Width: 100<br>Height : 55 | PASSED |
| 0001 | 1 | X : 130<br>Y : 160 | 0003 | DATA C | Width: 100<br>Height : 55 | PASSED |
| 0001 | 1 | X : 240<br>Y : 160 | 0003 | DATA C | Width: 100<br>Height : 55 | PASSED |

INSPECTING PRINT QUALITY OF A PRINT PRODUCT WITH COORDINATE INFORMATION ACQUIRED WITHOUT PRINTING THE IMAGE DATA

BACKGROUND OF THE INVENTION

Field of the Invention

The present invention relates to an inspection apparatus, an inspection system, a control method for the inspection apparatus, and a storage medium for inspecting print quality of print product.

Description of the Related Art

There is known an inspection apparatus which reads print product printed by an image forming apparatus and inspects print quality. The inspection apparatus is capable of detecting image defects such as stains and missing prints, character errors, bar code print quality, and the like. The print product in which these defects are detected is separated from the print product without defects by changing the sheet discharge destination, for example.

Print product inspection includes an inspection preparation and an inspection. In the inspection preparation, a reference image is registered in the inspection apparatus by scanning a good print product. In the inspection, an image to be inspected obtained by scanning the print product as an object of inspection is compared with a reference image to detect errors in the print product. In order to perform image comparison, it is necessary to associate the print product with the reference image. In this method, in order to register the reference image, it is necessary to print the print product once and register the print product. In the case of variable printing, since the content to be printed changes each time, it is very troublesome to print, scan, and register as a reference image each time. As a print product inspection in variable printing, there is a prior art in which a character and a region other than the character are extracted from image data and inspected using the image data (Japanese Patent Application Laid-Open No. 2018-179699).

However, in the method disclosed in Japanese Patent Application Laid-Open No. 2018-179699, it is necessary to perform inspection of the print product after dividing the print product into characters and other regions, which is time-consuming and inefficient.

The present invention has been made to solve the above problems. An object of the present invention is to provide a scheme for efficiently inspecting print product without labor.

SUMMARY OF THE INVENTION

According to an aspect of the present invention, an inspection apparatus inspecting print quality of a print product based on comparing an image scanned from the print product with a reference image comprises a memory and at least one processor in communication with the memory, wherein the at least one processor is configured to receive an image data used for generating a print job and layout information indicating an arrangement of the image data on a sheet from an information processing apparatus generating the print job and perform an inspection of print quality of a print product by comparing, based on the layout information, an image scanned from the print product printed based on the print job with the image data used for generating the print job.

Further features of the present invention will become apparent from the following description of exemplary embodiments with reference to the attached drawings.

BRIEF DESCRIPTION OF THE DRAWINGS

FIG. 1 illustrates a schematic diagram of an image forming system (inspection system) in the present embodiment.

FIG. 2 illustrates a block diagram of a control configuration of an image forming apparatus, an inspection apparatus, a large-capacity stacker, an information processing apparatus, and a client computer.

FIG. 4 illustrates an image diagram of a correspondence table between a print job and a reference image for inspection.

FIG. 9 illustrates an image of a stored inspection result in the second embodiment.

DESCRIPTION OF THE EMBODIMENTS

Figures 3A, 3B:
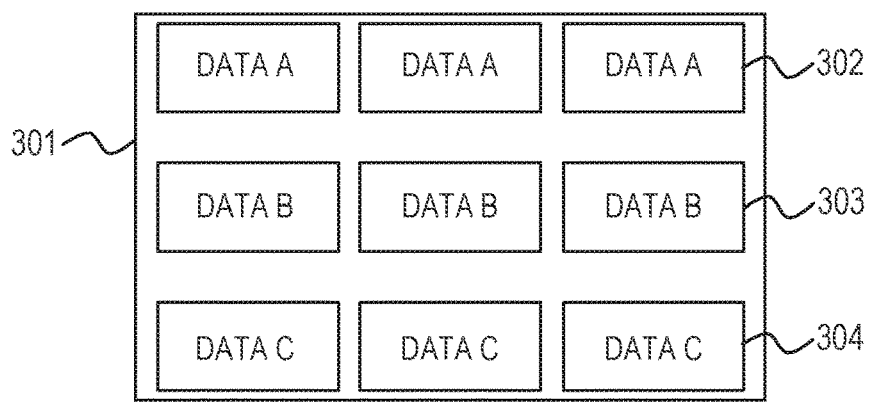
FIG. 3A illustrates an example of print data generated by the client computer.
FIG. 3B illustrates an example of layout information of print data generated by the client computer.

Hereinafter, an embodiment of the present invention will be described with reference to the drawings. It should be noted that the following embodiments do not limit the claimed invention, and not all of the combinations of features described in the embodiments are essential to the means for solving the invention.

First Embodiment

FIG. 1 is a schematic view showing an example of a configuration of an image forming system (inspection system) including an information processing apparatus, an inspection apparatus, and an image forming apparatus according to an embodiment of the present invention. Although the printing apparatus of the present embodiment will be described using an electrophotographic printing apparatus, the printing apparatus of the present embodiment may be a printing apparatus of a different image forming method such as an inkjet method or an offset method.

An image forming apparatus 101 is communicatively connected to an information processing apparatus 109 via a cable 112. The information processing apparatus 109 is communicatively connected to a client computer 110 and an inspection apparatus 108 via a network 113.

The image forming apparatus 101 includes a UI panel 102, a sheet feed deck 103, and a sheet feed deck 104. Further, the image forming apparatus 101 is connected to an option deck 105 consisting of three stages of sheet feed decks. The image forming apparatus 101 is, for example, an electrophotographic image forming apparatus. The UI panel 102 is a user interface having, for example, a capacitive touch panel.

The image forming apparatus 101 further includes an inspection unit 106 and a large-capacity stacker 107. The inspection unit 106 is communicably connected to the inspection apparatus 108 via a cable 114. The large-capacity stacker 107 is provided with a main tray and a top tray, and thousands of sheets of paper can be loaded on the main tray at a time.

A print job is generated by the client computer 110, transmitted to the information processing apparatus 109 via the network 113, and managed by the information processing apparatus 109. The print job is transmitted from the information processing apparatus 109 to the image forming apparatus 101 via the cable 112, and the image forming apparatus 101 performs printing on a sheet. The print job may be generated and managed by the information processing apparatus 109, transmitted to the image forming apparatus 101 via the cable 112, and managed by the image forming apparatus 101.

The client computer 110, the information processing apparatus 109, and the inspection apparatus 108 may be connected to the cable 112 to communicate with the image forming apparatus 101. That is, the connection configuration of the image forming apparatus 101, the information processing apparatus 109, and the client computer 110 shown in the present embodiment is an example, and it goes without saying that there are various connection configurations other than those shown in the present embodiment.

The client computer 110 imposes a plurality of image data to obtain an image data for printing. Therefore, the client computer 110 has information about how the image data for printing is laid out. Therefore, in the present embodiment, instead of intentionally extracting a region required for the inspection from the image data as in the prior art, the efficient inspection is performed by inspecting the image data based on layout information included in the image data for printing.

FIG. 2 illustrates a block diagram of an example of a control configuration of the image forming apparatus 101, the inspection apparatus 108, the large-capacity stacker 107, the information processing apparatus 109, and the client computer 110. First, the image forming apparatus 101 will be described. A central processing unit (CPU) 201 controls and calculates each section of the image forming apparatus 101 via a system bus 212. The CPU 201 controls the execution of a program stored in the storage unit 205 and loaded into a RAM (Random Access Memory) 202.

The RAM 202 is a type of general volatile storage device directly accessible from the CPU 201, and is used as a work area of the CPU 201 or other temporary data storage area. A storage unit 205 stores control programs and data of the image forming apparatus 101, and functions as a temporary storage area and a work memory during the operation of the image forming apparatus 101. The storage unit 205 includes an HDD (Hard Disk Drive), SSD (Solid State Drive), and the like.

An engine I/F 209 controls communication and control with a printer engine 210. A sheet feed deck I/F 204 controls communication and control with a sheet feed deck 211. The sheet feed deck 211 is generally referred to as a hard structure of sheet feed decks 103, 104 and the option deck 105. A UI panel 203 is a hard structure of the UI panel 102, and is a user interface for performing general operations of the image forming apparatus 101. In this embodiment, the UI panel 203 is provided with a capacitive touch panel.

A network interface (NW I/F) 207 is connected to a NW I/F 238 of the information processing apparatus 109 via a cable 213, and controls communication between the information processing apparatus 109 and the image forming apparatus 101. In this example, the interfaces connected to the system buses 212 and 239 are directly connected to each other, but the information processing apparatus 109 and the image forming apparatus 101 may be connected by a network, for example, and the connection type is not limited. A video I/F 206 is connected to a video I/F 233 of the information processing apparatus 109 via a video cable 241 and controls communication of image data between the information processing apparatus 109 and the image forming apparatus 101. The connection interface between the information processing apparatus 109 and the image forming apparatus 101 may be of a form integrating the functions of the NW I/F 238 and the video I/F 233. The connection interface with the information processing apparatus 109 in the image forming apparatus 101 may be of a form integrating the functions of the NW I/F 207 and the video I/F 206. In FIG. 1, the cable 213 and the video cable 241 are combined and shown as the cable 112.

An accessory I/F 208 is connected to an accessory I/F 214 of the inspection unit 106 and an accessory I/F 220 of the large-capacity stacker 107 via a cable 225. That is, the image forming apparatus 101 communicates with the inspection unit 106 and the large-capacity stacker 107 via the accessory I/Fs 208, 214, and 220.

Next, the inspection unit 106 will be described. A CPU 216 controls and calculates each section of the inspection unit 106 via a system bus 219, and executes a program stored in a storage unit 247 and loaded into a RAM 217. The RAM 217 is a type of general volatile storage device directly accessible from the CPU 216, and is used as a work area of the CPU 216 or other temporary data storage area. The storage unit 247 stores control programs and data of the inspection unit 106, and functions as a temporary storage area and a work memory during operation of the inspection device. The storage unit 247 includes an HDD, an SSD, or the like.

An inspection apparatus I/F 215 is connected to an inspection unit I/F 231 of the inspection apparatus 108 via the cable 248. That is, the inspection unit 106 communicates with the inspection apparatus 108 via the inspection apparatus I/F 215 and the inspection unit I/F 231. The accessory I/F 214 is connected to the accessory I/F 208 of the image forming apparatus 101 via the cable 225.

A capturing unit 218 has a photographing function equipped with, for example, a conductor image sensor (hereinafter CIS), captures a sheet passing through the inspection unit 106, and transmits the captured image to the inspection apparatus 108 via the inspection apparatus I/F 215. The CIS for the capturing unit 218 is an example of a sensor, and may be another type of sensor such as a CCD image sensor, and the imaging method thereof is not limited.

Next, the large-capacity stacker 107 will be described. A CPU 221 controls and calculates each section of the large-capacity stacker 107 via a system bus 224, and executes a program stored in a storage unit 248 and loaded into a RAM 222. The RAM 222 is a type of general volatile storage device directly accessible from the CPU 221, and is used as a work area of the CPU 221 or other temporary data storage area.

The storage unit 248 stores control programs and data of the large-capacity stacker 107, and functions as a temporary storage area and a work memory during the large-capacity stacker operation. The storage unit 248 includes an HDD, an SSD, or the like. The accessory I/F 220 is connected to the accessory I/F 208 of the image forming apparatus 101 via the cable 225. The discharge unit 223 controls the sheet discharge operation to the main tray and the top tray, and the monitoring and control of the loading conditions of the main tray and the top tray.

Next, the inspection apparatus 108 will be described. A CPU 226 controls and calculates each section of the inspection apparatus 108 via the system bus 230, and executes a program stored in a storage unit 228 and loaded into a RAM 227. The RAM 227 is a type of general volatile storage device directly accessible from the CPU 226, and is used as a work area of the CPU 226 or other temporary data storage area. The storage unit 228 stores control programs and data, and functions as a temporary storage area and a work memory during operation of the inspection apparatus 108. The storage unit 228 includes an HDD, an SSD, or the like.

A PDL analysis unit 229 reads PDL data such as PDF, PostScript, PCL, and the like, received from the client computer 110 or the information processing apparatus 109 and executes interpretation processing. A display unit 245 is, for example, a liquid crystal display connected to the inspection apparatus 108, and receives user input to the inspection apparatus 108 and displays the state of the inspection apparatus 108. The inspection unit I/F 231 is connected to an inspection apparatus I/F 215 of the inspection unit 106 via the cable 248. A NW I/F 232 is connected to the network 113.

Next, the information processing apparatus 109 will be described. A CPU 234 controls and calculates each section of the information processing apparatus 109 via a system bus 239, and executes a program stored in a storage unit 236 and loaded into a RAM 235. The RAM 235 is a type of general volatile storage device directly accessible from the CPU 234, and is used as a work area of the CPU 234 or other temporary data storage area. The storage unit 236 stores control programs and data of the information processing apparatus 109, and functions as a temporary storage area and a work memory during the operation of the information processing apparatus. The storage unit 236 includes an HDD, an SSD, or the like.

The NW I/F 238 is connected to the NW I/F 207 of the image forming apparatus 101 via the cable 213. The video I/F 233 is connected to the video I/F 206 of the image forming apparatus 101 via the video cable 241.

A NW I/F 237 is connected to the NW I/F 232 of the inspection apparatus 108 and a NW I/F 240 of the client computer 110 via the network 113. That is, the information processing apparatus 109 communicates with the inspection apparatus 108 via the NW I/F 237 and the NW I/F 232. The information processing apparatus 109 communicates with the client computer 110 via the NW I/F 237 and the NW I/F 240.

The client computer 110 will be described. A CPU 243 controls and calculates each section of the client computer 110 via a system bus 246, and executes a program stored in a storage unit 244 and loaded into the RAM 242.

The RAM 242 is a type of general volatile storage device directly accessible from the CPU 243, and is used as a work area of the CPU 243 or other temporary data storage area. The storage unit 244 stores control programs and data, and functions as a temporary storage area and a work memory during client computer operation. The storage unit 244 includes an HDD, an SSD, or the like. The NW I/F 240 is connected to the network 113.

FIGS. 3A and 3B illustrate diagrams of an example of print data and layout information generated by the client computer 110. FIG. 3A illustrates an example of print data. A reference sign 301 denotes print data. Reference signs 302, 303, and 304 denote image data, respectively. The CPU 243 of the client computer 110 can impose a plurality of image data such as image data 302, 303, and 304 on one page to create print data such as print data 301.

FIG. 3B illustrates an example of layout information. The layout information 305 is information indicating how the print data 301 is printed. The coordinates 306 are information on which positions the data is imposed in the print data 301. The data ID 307 and the data name 308 are information indicating which image data is included in the print data 301. The data size 309 is information indicating what size image data is imposed in the print data 301. By using the information of 306 to 309, it is possible to know which image data is arranged at which position and with what size, and thereby the print data 301 is generated. That is, the layout information 305 indicates the arrangement of the image data used to generate the print job on the sheet.

FIG. 4 illustrates an image diagram of a table showing how the print job is associated with the reference image of the inspection stored in the storage unit 228 of the inspection apparatus 108. A correspondence table 401 shows which reference image and which inspection setting are associated with which print job. The correspondence table 401 is created by the CPU 226 of the inspection apparatus 108 and stored in the storage unit 228 of the inspection apparatus 108.

A job ID 402 is a job ID of a print job, and is information for identifying the print job. A data ID 403 and a data name 404 are information indicating what kind of image data is used in the print job as in FIG. 3B. A reference image 405 is information indicating what reference image is registered (associated) with the data ID 403 and the data name 404. An inspection setting 406 is information indicating what kind of inspection is to be performed on the job ID 402, the data ID 403, the data name 404, and the reference image 405. Using the information of 402 to 406, it is possible to know what kind of inspection is performed for which image data of which job and which reference image are used.

Figure 5:
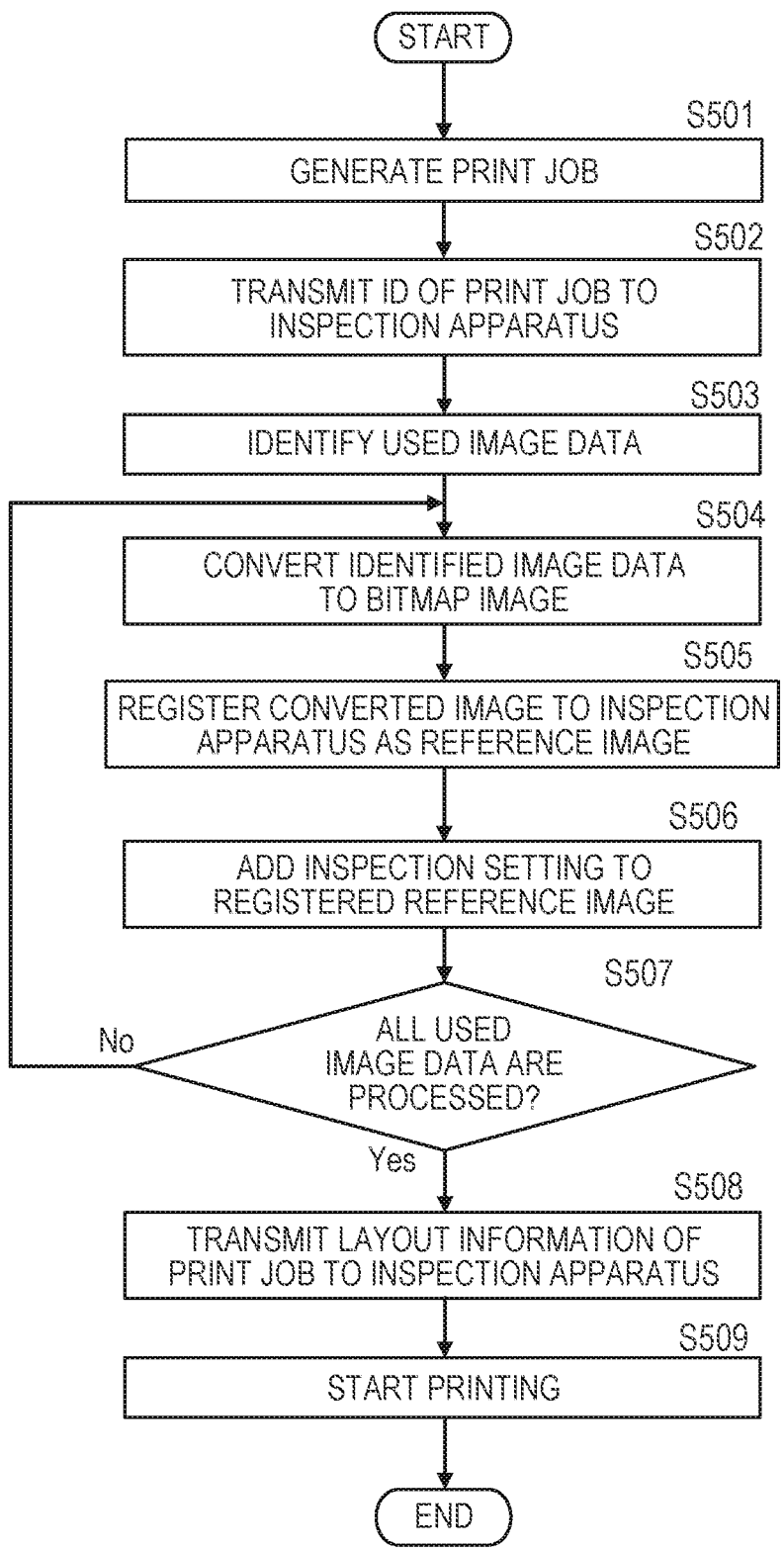
FIG. 5 illustrates a flowchart of an example of processing of the client computer.

An entire flow of the inspection processing system according to the present embodiment will be described with reference to FIGS. 5, 6, and 7. FIG. 5 illustrates a flowchart of an example of processing performed by the client computer 110. This process corresponds to a process in which the client computer 110 generates a print job, and transmits a correspondence table 401 indicating which reference image or inspection setting corresponds to which print job, and layout information 305 to the inspection apparatus 108. The processing of the flowchart is realized by the CPU 243 of the client computer 110 reading the program stored in the storage unit 244 into the RAM 242 and executing it as necessary.

In step S501, the CPU 243 generates a print job. In step S502, the CPU 243 transmits the job ID of the print job generated in step S501 to the inspection apparatus 108 via the network 113. The CPU 226 of the inspection apparatus 108 receives the job ID and stores the job ID in the storage unit 228. Next, in step S503, the CPU 243 identifies what image data is used in the generation of the print job in step S501.

Next, in step S504, the CPU 243 converts one of the data identified in step S503 into a bitmap image for use in the inspection. Next, in step S505, the CPU 243 transmits the image converted in step S504 to the inspection apparatus 108 as a reference image for use in the inspection along with the data ID, the data name, and the job ID of the print job via the network 113. The CPU 226 of the inspection apparatus 108 receives the information, associates the information with the job ID, and stores the information in the storage unit 228. Thus, the reference image used in the inspection is registered in the inspection apparatus 108.

Next, in step S506, the CPU 243 sets the kind of inspection to be performed using the reference image registered in step S505, and transmits the information (inspection setting) together with the job ID and the data ID to the inspection apparatus 108 via the network 113. The CPU 226 of the inspection apparatus 108 receives this information, associates the information with the job ID and the data ID, and stores the information in the storage unit 228. In the inspection setting, for example, a user sets an inspection setting as shown in 406 in FIG. 4 from an operation unit (not shown) of the client computer 110.

Next, in step S507, the CPU 243 checks whether the processes in steps S504 to S506 have been performed for all the image data used for the print job. If the processes have not been performed for all the image data used for the print job (No in step S507), the CPU 243 returns the processing to step S504 and controls to repeat the processing for all the image data. On the other hand, if the processes have already been performed for all the image data used for the print job (Yes in step S507), the CPU 243 proceeds to step S508. As a result of the processing up to step S507, the information shown in FIG. 4 (correspondence table 401) is completed. That is, information such as the correspondence table 401 is stored in the storage unit 228 of the inspection apparatus 108.

In step S508, the CPU 243 transmits the layout information of the print job generated in step S501 with the job ID to the inspection apparatus 108 via the network 113. The CPU 226 of the inspection apparatus 108 receives the information, associates the information with the job ID, and stores the information in the storage unit 228. Here, the layout information represents information as shown in FIG. 3B.

Figure 6:
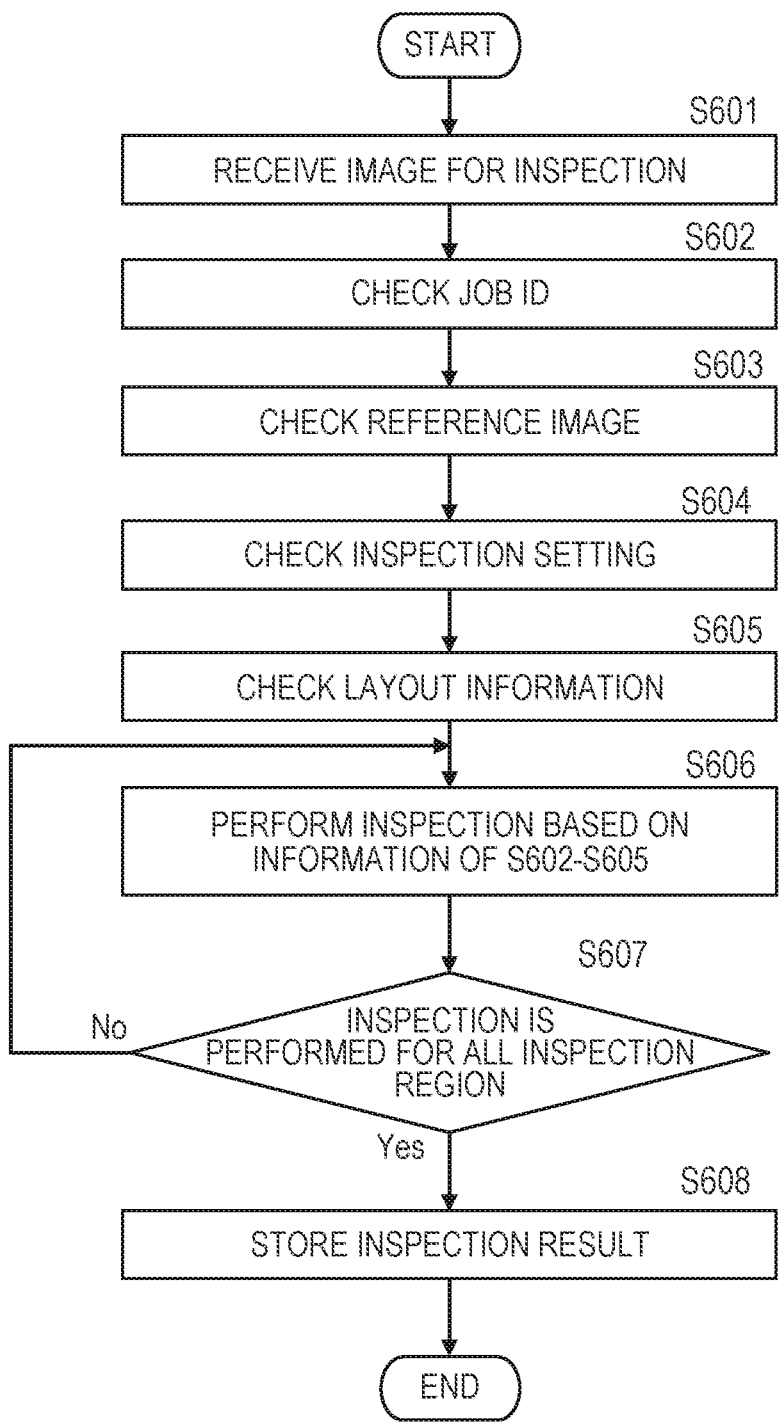
FIG. 6 illustrates a flowchart of an example of processing of the inspection apparatus according to the first embodiment.

FIG. 6 illustrates a flowchart of an example of processing of the inspection apparatus 108 according to the first embodiment. This processing corresponds to the processing in which the inspection apparatus 108 performs inspection based on the information received from the client computer 110. The processing of the flowchart is realized by the CPU 226 of the inspection apparatus 108 reading the program stored in the storage unit 228 into the RAM 227 and executing it as necessary.

When the CPU 226 of the inspection apparatus 108 receives the image of the inspection object captured by the capturing unit 218 of the inspection unit 106 via the inspection apparatus I/F 215 at step S601, the processing proceeds to step S602.

In step S602, the CPU 226 checks the job ID corresponding to the image to be inspected in step S601 in order to obtain information necessary for performing the inspection. The CPU 226 checks the job ID with the information processing apparatus 109 or the image forming apparatus 101, for example. The CPU 226 may receive the job ID corresponding to the printing of the image with the image to be inspected in step S601. Further, when the print job for printing the image to be inspected is started by the image forming apparatus 101, the CPU 226 may receive the job ID from the information processing apparatus 109 or the image forming apparatus 101.

In step S603, the CPU 226 acquires reference image information including the data ID, the data name, and the like associated with the job ID acquired in S602. Further, in step S604, the CPU 226 acquires inspection setting information on what kind of inspection is to be performed based on the reference image information including the job ID acquired in S602, the data ID, the data name, and the like acquired in S603. Next, in step S605, the CPU 226 acquires the layout information of the print job using the job ID acquired in step S602.

Next, in step S606, the CPU 226 inspects the image to be inspected acquired in step S601 based on the information acquired in steps S602 to 605. In the present embodiment, the image to be inspected is inspected for each region based on the layout information 305 (that is, the region corresponding to one set of information in 306 to 309). When the layout information 305 of FIG. 3B is used, for example, an image of the region having a data size (width: 100, Height: 55) with respect to the coordinates (X: 20, Y: 20) of the image to be inspected is inspected (compared) using the reference image (AAA.bmp) of the data A. In this case, the inspection setting is performed by using the inspection setting (stain inspection: level 1, streak inspection: level 2) corresponding to the "data A" set by being associated with the job ID "0001" in the inspection setting 406 of FIG. 4.

Next, in step S607, the CPU 226 checks whether all the regions to be inspected have been inspected (the inspection in step S605). If there is a region to be inspected that has not been inspected yet (No in step S607), the CPU 226 returns the process to step S606 and performs control to inspect the next region to be inspected. On the other hand, if the inspection is completed for all the regions to be inspected (Yes in step S607), the CPU 226 proceeds to step S608.

Although the inspection is performed for each inspection target region based on the layout information in the present embodiment, the inspection apparatus 108 may synthesize the image data for inspection based on the information from steps S602 to S605, and perform the inspection using the synthesized image as the reference image.

In step S608, the CPU 226 stores (outputs) a comprehensive inspection result acquired by inspecting all the regions to be inspected on one page to the storage unit 228 of the inspection apparatus 108. The data stored at this time is as shown in FIG. 7, which will be described later.

Figure 7:
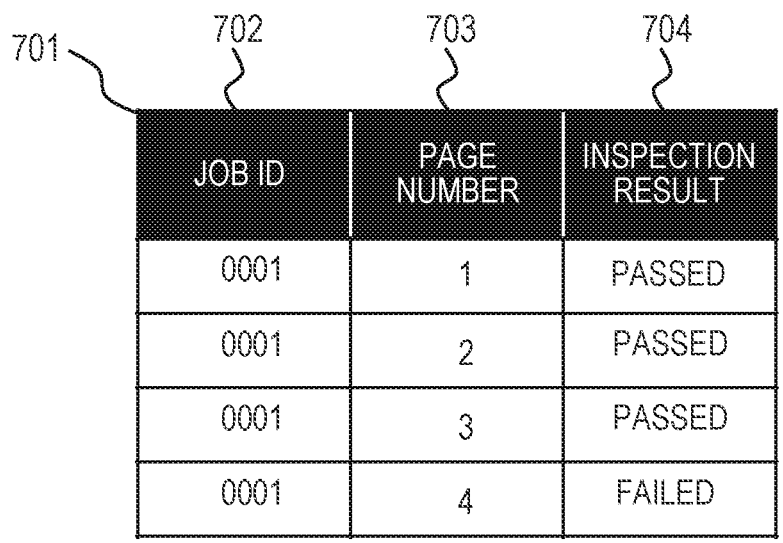
FIG. 7 illustrates an image of a stored inspection result in the first embodiment.

FIG. 7 illustrates an image diagram showing how inspection results are stored in the first embodiment. The inspection result is stored in the storage unit 228 of the inspection apparatus 108. The correspondence table 701 shows inspection results when the inspection is performed by using the inspection apparatus 108. The inspection result includes a job ID 702 indicating the inspection result of which job, a page number 703 indicating the inspection result of which page, and an inspection result 704 indicating how the inspection result was.

In the inspection result 704, information indicating "passed" is stored when the image passed the inspection, and information indicating "failed" is stored when the image failed the inspection. Although "passed" and "failed" are described here as examples, they are examples only, and any information can be used as long as "passed" and "failed" can be expressed in accordance with the meaning.

As described above, in the first embodiment, the client computer 110 transmits layout information such as which image data is imposed and how image data is imposed, reference image information, and inspection setting information to the inspection apparatus 108, and the inspection apparatus 108 performs inspection. Thus, the inspection can be efficiently performed without the trouble of printing once, scanning, and registering the reference image.

Second Embodiment

In the first embodiment, an overall result for each page is stored as an inspection result. However, since the inspection is performed based on grasping where and which image data is arranged with the layout information of the print job, the inspection result may be stored for each region. Thus, the inspection result of each unit region in one page can be grasp in more detail.

Figure 8:
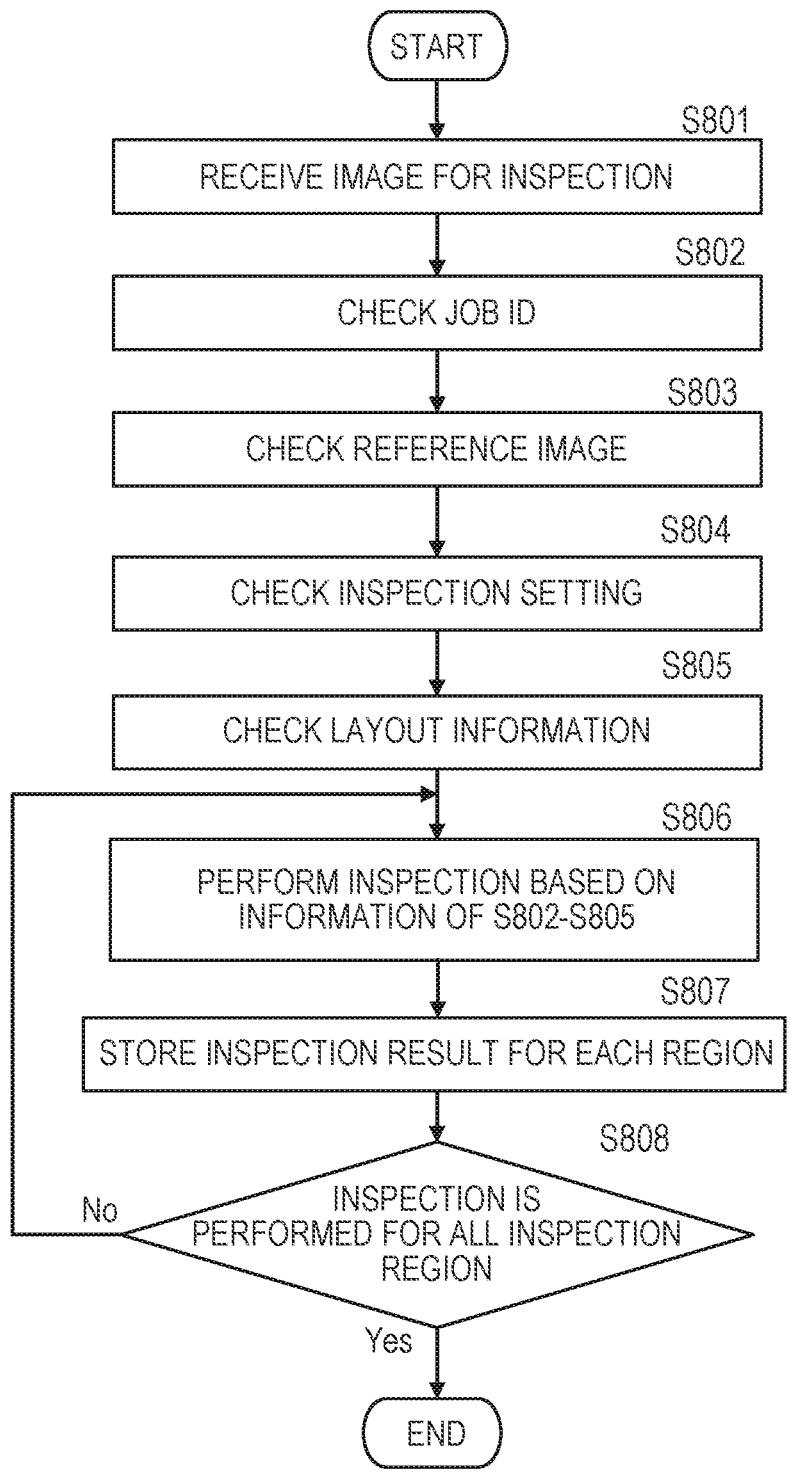
FIG. 8 illustrates a flowchart of an example of processing of the inspection apparatus according to the second embodiment.

Referring to FIGS. 8 and 9, the flow of storing the inspection results in each region will be described. FIG. 8 illustrates a flowchart of an example of processing of the inspection apparatus 108 according to the second embodiment. The processing of the flowchart is realized by the CPU 226 of the inspection apparatus 108 reading the program stored in the storage unit 228 into the RAM 227 and executing it as necessary. First, the processes of steps S801 to S806 are the same as the processes of steps S601 to S606 of FIG. 6 in the first embodiment, and therefore the description thereof is omitted.

In step S807, the CPU 226 associates the information inspected in step S806 with the layout information shown in FIG. 3B and stores the information in the storage unit 228 of the inspection apparatus 108. Specifically, it is stored as shown in FIG. 9, which will be described later. That is, the inspection result is stored for each region to be inspected.

Next, in step S808, the CPU 226 checks whether all the regions to be inspected have been inspected (the inspection in step S806). If there is a region to be inspected that has not yet been inspected (No in step S808), the CPU 226 returns the process to step S806 and performs control to inspect the next region to be inspected. On the other hand, if the inspection is completed for all the regions to be inspected (Yes in step S808), the CPU 226 terminates the processing of this flowchart.

FIG. 9 illustrates an image diagram showing how inspection results are stored in the second embodiment. The inspection result is stored in the storage unit 228 of the inspection apparatus 108. The correspondence table 901 shows inspection results when the inspection is performed using the inspection apparatus 108. The inspection result includes a job ID 902, a page number 903, coordinates 904, a data ID 905, a data name 906, a data size 907, and an inspection result 908.

The job ID 902 indicates the print job corresponding to the inspection result. The page number 903 indicates the page corresponding to the inspection result. The coordinates 904 are information corresponding to the region in the page where the data are imposed, that is, indicate which region in the page the inspection results is. The data ID 905 and the data name 906 are information indicating what kind of image data is used. The data size 907 is information indicating the size of the image data to be imposed, and indicates the size of the inspected image data. The inspection result 908 indicates the inspected result. The inspection result 908 stores information indicating "passed" when the image passed the inspection and information indicating "failed" when the image failed the inspection. Although "passed" and "failed" are described here as examples, they are examples only, and any information can be used as long as "passed" and "failed" can be expressed in accordance with the meaning. In addition to the individual inspection results for each region, a comprehensive result for each page may also be stored. In this case, if there is even one "failed" region, the overall result may be set as "failed", and if there is even one "passed" region, the overall result may be set as "passed" (the same applies to the first embodiment).

As described above, it is possible to grasp an inspection result indicating where something is wrong in the page efficiently, more precisely and in more detail by associating the image data with layout information such as which image data is imposed and how image data is imposed and storing the inspection result.

The inspection apparatus 108 may be connected to the client computer 110 or the inspection unit 106 via the Internet or the like. For example, the cloud service may be used to realize the function of the inspection apparatus 108.

As described above, in each embodiment of the present invention, the image data and layout information used for generating the print job are received from the client computer 110 generating the print job, instead of printing, scanning, and registering the reference image. An image scanned from the print product printed based on the print job and image data used for generating the print job are compared based on the layout information to inspect the print quality of the print product. As a result, it is not necessary to print, scan, and register the reference image, and the print quality of the print product can be efficiently inspected without a trouble.

The configuration and contents of the various data described above are not limited thereto, and it is needless to say that the various configurations and contents are configured according to the use and purpose. Although one embodiment has been described above, the present invention may be implemented, for example, as a system, apparatus, method, program, or storage medium. Specifically, the present invention may be applied to a system comprising a plurality of apparatuses, or may be applied to an apparatus comprising one apparatus. Further, all the configurations in which the above embodiments are combined are also included in the present invention.

According to the present invention, the print product can be inspected efficiently without a trouble.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-136148, filed Aug. 24, 2021, which is hereby incorporated by reference herein in its entirety.

What is claimed is:

1. An inspection apparatus inspecting print quality of a print product based on comparing an image scanned from the print product with a reference image comprising:
a memory; and
at least one processor in communication with the memory, wherein the at least one processor is configured to:
receive image data used for generating a print job and layout information including coordinate information indicating an arrangement of the image data on a sheet from an information processing apparatus that generated the print job; and
perform an inspection of print quality of a print product by (i) acquiring, without printing the image data, the layout information including the coordinate information and (ii) comparing, based on the layout information including the coordinate information that was acquired without printing the image data, an image scanned from the print product printed based on the print job with the image data used for generating the print job.

2. The inspection apparatus according to claim 1, wherein the at least one processor is further configured to:
receive an inspection setting for the inspection using the image data as a reference image from the information processing apparatus; and
perform the inspection according to the image data based on the inspection setting by comparing, based on the layout information, the image scanned from the print product printed based on the print job with the image data used for generating the print job.

3. The inspection apparatus according to claim 1, wherein the at least one processor is configured to perform the inspection of the image scanned from the print product for each region corresponding to the image data based on the layout information.

4. The inspection apparatus according to claim 3, wherein the at least one processor is configured to output results of the inspection for each region.

5. The inspection apparatus according to claim 1, wherein the at least one processor is configured to generate an image synthesized from the image data based on the layout information to inspect the print quality of the print product by comparing the generated image with the image scanned from the print product printed based on the print job.

6. An inspection system comprising:
an information processing apparatus configured to generate a print job, the information apparatus comprising:
a first memory; and
at least one first processor in communication with the first memory; and
an inspection apparatus configured to inspect print quality of a print product based on comparing an image scanned from the print product with a reference image, the inspection apparatus comprising:
a second memory; and
at least one second processor in communication with the second memory,
wherein the at least one first processor is configured to deliver image data used for generating the print job and layout information including coordinate information indicating an arrangement of the image data on a sheet to the inspection apparatus,
wherein the at least one second processor is configured to:
receive the image data used for generating the print job and the layout information including coordinate information indicating the arrangement of the image data on the sheet from the information processing apparatus; and
perform an inspection of print quality of a print product by (i) acquiring, without printing the image data, the layout information including the coordinate information and (ii) comparing, based on the layout information including the coordinate information that was acquired without printing the image data, an image scanned from the print product printed based on the print job with the image data used for generating the print job.

7. A control method for controlling an inspection apparatus inspecting print quality of a print product based on comparing an image scanned from the print product with a reference image, the control method comprising:
receiving image data used for generating a print job and layout information including coordinate information indicating an arrangement of the image data on a sheet from an information processing apparatus that generated the print job; and
performing an inspection of print quality of a print product by (i) acquiring, without printing the image data, the layout information including the coordinate information and (ii) comparing, based on the layout information including the coordinate information that was acquired without printing the image data, an image scanned from the print product printed based on the print job with the image data used for generating the print job.

8. A non-transitory computer-readable storage medium storing program to cause a computer to perform a control method for controlling an inspection apparatus inspecting print quality of a print product based on comparing an image scanned from the print product with a reference image, the control method comprising:
receiving image data used for generating a print job and layout information including coordinate information indicating an arrangement of the image data on a sheet from an information processing apparatus that generated the print job; and
performing an inspection of print quality of a print product by (i) acquiring, without printing the image data, the layout information including the coordinate information and (ii) comparing, based on the layout information including the coordinate information that was acquired without printing the image data, an image scanned from the print product printed based on the print job with the image data used for generating the print job.

9. The non-transitory computer-readable storage medium according to claim 8, wherein the control method further comprises:
receiving an inspection setting for the inspection using the image data as a reference image from the information processing apparatus; and
performing the inspection according to the image data based on the inspection setting by comparing, based on the layout information, the image scanned from the print product printed based on the print job with the image data used for generating the print job.

10. The non-transitory computer-readable storage medium according to claim 8, wherein the inspection of the image scanned from the print product is performed for each region corresponding to the image data based on the layout information.

11. The non-transitory computer-readable storage medium according to claim 10, wherein the control method further comprises outputting results of the inspection for each region.

12. The non-transitory computer-readable storage medium according to claim 8, wherein the control method further comprises generating an image synthesized from the image data based on the layout information to inspect the print quality of the print product by comparing the generated image with the image scanned from the print product printed based on the print job.

13. The control method according to claim 7, wherein the control method further comprises:
   receiving an inspection setting for the inspection using the image data as a reference image from the information processing apparatus; and
   performing the inspection according to the image data based on the inspection setting by comparing, based on the layout information, the image scanned from the print product printed based on the print job with the image data used for generating the print job.

14. The control method according to claim 7, wherein the inspection of the image scanned from the print product is performed for each region corresponding to the image data based on the layout information.

15. The control method according to claim 14, wherein the control method further comprises outputting results of the inspection for each region.

16. The control method according to claim 7, wherein the control method further comprises generating an image synthesized from the image data based on the layout information to inspect the print quality of the print product by comparing the generated image with the image scanned from the print product printed based on the print job.

17. The inspection system according to claim 6, wherein the at least one second processor is further configured to:
   receive an inspection setting for the inspection using the image data as a reference image from the information processing apparatus; and
   perform the inspection according to the image data based on the inspection setting by comparing, based on the layout information, the image scanned from the print product printed based on the print job with the image data used for generating the print job.

18. The inspection system according to claim 6, wherein the at least one second processor is configured to perform the inspection of the image scanned from the print product for each region corresponding to the image data based on the layout information.

19. The inspection system according to claim 18, wherein the at least one second processor is configured to output results of the inspection for each region.

20. The inspection system according to claim 6, wherein the at least one second processor is configured to generate an image synthesized from the image data based on the layout information to inspect the print quality of the print product by comparing the generated image with the image scanned from the print product printed based on the print job.

* * * * *